United States Patent [19]
Neier

[11] 3,790,138
[45] Feb. 5, 1974

[54] FEED MIXER

[75] Inventor: Benjamin R. Neier, Dodge City, Kans.

[73] Assignee: B/J Manufacturing Co. Inc., Dodge City, Kans.

[22] Filed: June 19, 1972

[21] Appl. No.: 263,962

[52] U.S. Cl. .................................................. 259/41
[51] Int. Cl. ........ B01f 7/04, B01f 15/02, B01f 7/08
[58] Field of Search .............. 259/6, 21, 41, 64, 104

[56] References Cited
UNITED STATES PATENTS

| | | | |
|---|---|---|---|
| 3,421,740 | 1/1969 | Behrens | 259/41 |
| 912,628 | 2/1909 | Sherman | 259/41 X |
| 3,216,375 | 11/1965 | Ernst | 259/41 X |
| 3,706,442 | 12/1972 | Peat | 259/6 X |

Primary Examiner—Peter Feldman
Assistant Examiner—Alan I. Cantor
Attorney, Agent, or Firm—Fishburn, Gold & Litman

[57] ABSTRACT

A material mixing apparatus for mixing a mass of materials to form a feeding ration for animals includes spaced elongated augers within a lower portion of a mixing chamber and spaced elongated agitators within an upper portion of the mixing chamber and having at least two sets of paddles thereon. The augers each have flights thereon to move materials along a bottom portion of the mixing chamber and toward an area of mutual convergence located adjacent a normally closed entrance to a passage having a conveyor therein to discharge mixed materials received from the mixing chamber. The augers and agitators are rotated at different speeds to thoroughly blend the mass of material within the mixing chamber and direct same toward a portion of the mixing chamber between said agitators.

12 Claims, 12 Drawing Figures

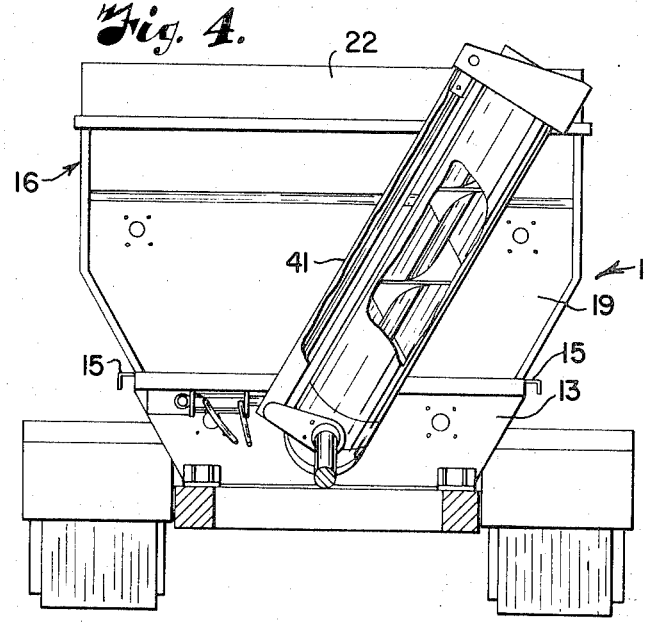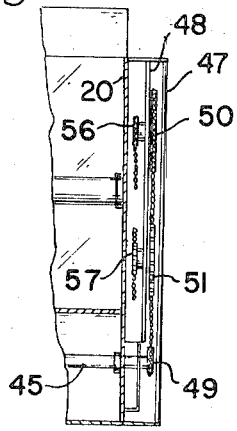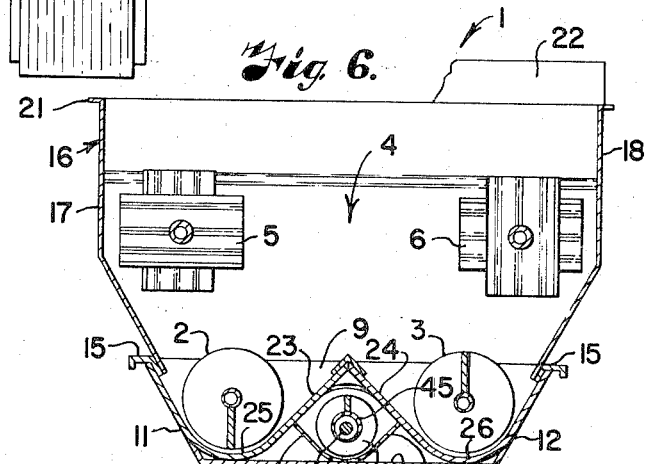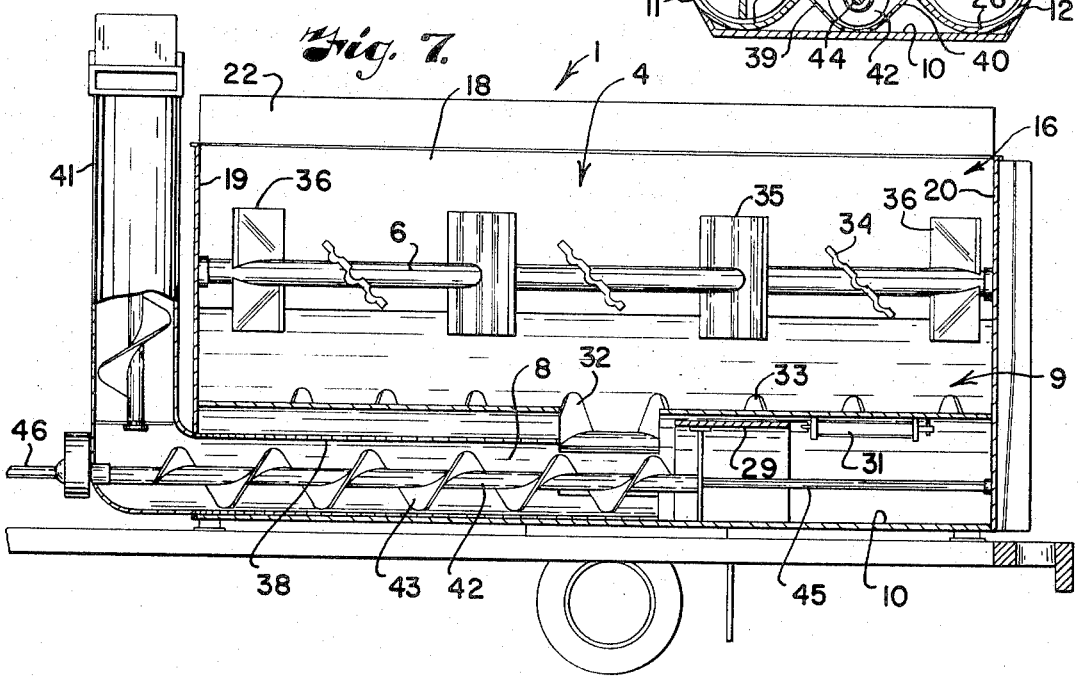

FEED MIXER

The present invention relates to material mixing apparatus and more particularly to a material mixing apparatus having augers within a lower portion of a mixing chamber and agitators positioned within an upper portion of the mixing chamber for blending materials.

The principal objects of the present invention are: to provide a material mixing apparatus particularly adapted to produce a high uniformity of mixing in a reasonable time and which is easy to load and unload and is adapted to receive different types of feed materials such as grain, food supplements, silage, molasses, and the like and produce therefrom in a substantially homogenous mix that is ready for animal consumption; to provide such a material mixing apparatus particularly adapted for precision mixing of a plurality of materials having different physical characteristics, such as weight, size, viscosity, cohesiveness and the like; to provide such a material mixing apparatus having agitators in an upper portion of a mixing chamber, and augers within a lower portion of the mixing chamber with the augers and agitators rotated at different speeds; to provide such a material mixing apparatus adapted to effect fast circulation of materials therein thereby substantially reducing the required mixing time and adapted to insure uniformly blended materials; to provide such a material mixing apparatus having laterally spaced augers wherein flights of the augers are arranged to effect an area of mutual convergence adjacent an entrance opening to a discharge passage having a conveyor therein adapted to receive materials from the mixing chamber; to provide such a material mixing apparatus having material moving and mixing elements therein cooperating to circulate the materials to be mixed throughout the entire mixing chamber; and to provide such a material mixing apparatus which is positive in operation, durable in construction, and particularly well adapted for the proposed use.

Other objects and advantages of this invention will become apparent from the following description taken in connection with the accompanying drawings wherein are set forth by way of illustration and example certain embodiments of this invention.

The drawings constitute a part of this specification and include an exemplary embodiment of the present invention and illustrate various objects and features of the material mixing apparatus.

FIG. 4 is a front elevational view showing a materials discharge chute or elevator communicating with the material mixing chamber.

FIG. 6 is a transverse sectional view taken on line 6—6, FIG. 5.

FIG. 7 is a longitudinal sectional view showing a screw conveyor within the materials receiving chamber for effecting discharge of materials therefrom.

FIG. 8 is a fragmentary longitudinal sectional view taken on line 8—8, FIG. 3 and showing the means for turning the agitators and screw conveyors.

Figure 1:
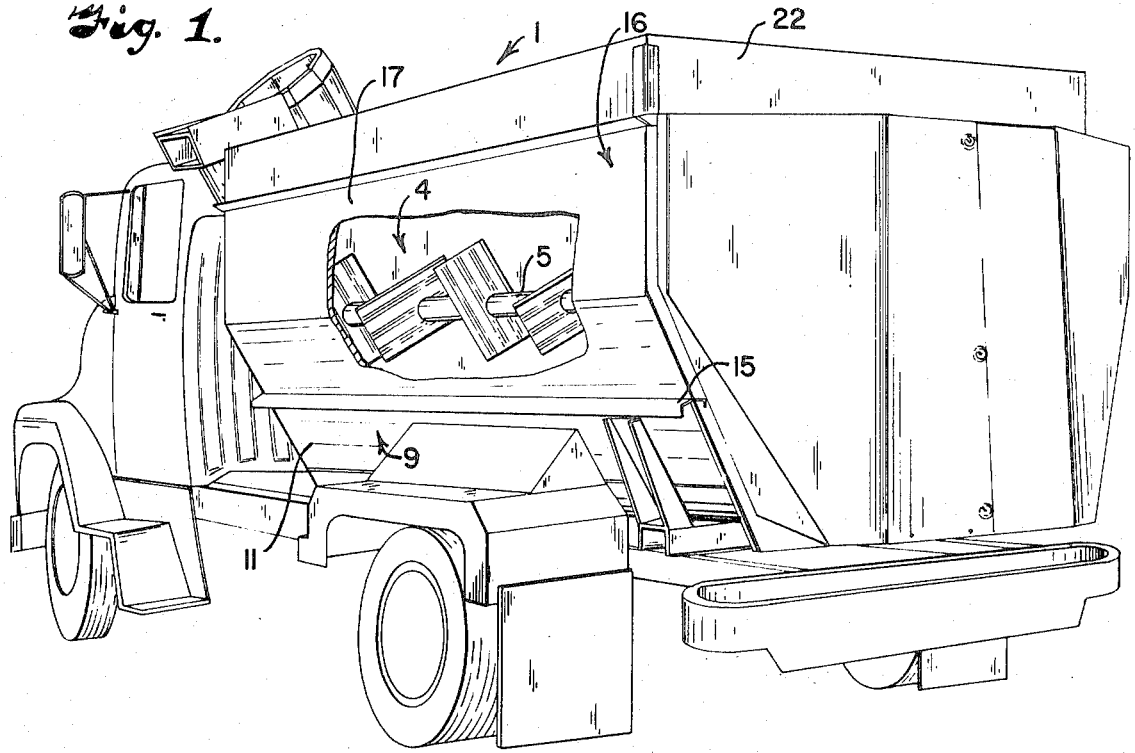
FIG. 1 is a perspective view of a material mixing apparatus embodying features of the present invention with portions broken away to show an agitator within a mixing chamber.
Figure 2:
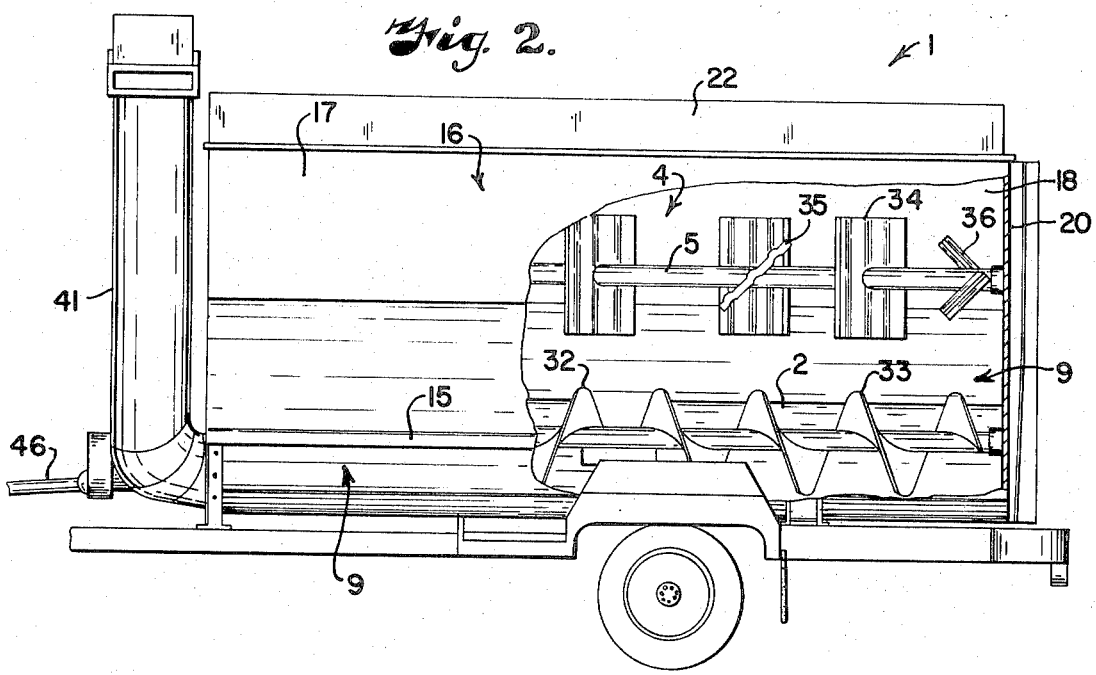
FIG. 2 is a side elevational view of the material mixing apparatus with portions broken away to show agitators and screw conveyors within the mixing chamber.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate detailed structure.

In the disclosed embodiment of the present invention, the reference numeral 1 generally designates a material mixing apparatus for mixing a mass of materials to form a feeding ration for farm animals. The material mixing apparatus 1 includes material moving means in the form of an auger or augers in a lower portion of a mixing chamber and agitator members in an upper portion operative to move and mix feed material. In the illustrated structure the moving means are laterally spaced augers or screw conveyor members 2 and 3 within a lower portion of a mixing chamber 4 and material blending and mixing means in the form of laterally spaced agitators 5 and 6 within an upper portion of the mixing chamber 4. The augers 2 and 3 each have a pair of opposed flights thereon arranged to move materials to be mixed along a bottom portion of the mixing chamber 4 and toward an area of mutual convergence located adjacent a normally closed entrance opening 7 to a passage 8 within the lower portion of the mixing chamber 4 and having a conveyor therein to receive the mixed materials from the mixing chamber 4. The augers 2 and 3 and the agitators 5 and 6 are rotated to thoroughly blend the mass of materials within the mixing chamber 4.

The mixing chamber 4 may be any desired shape and construction, however, the illustrated structure has a lower portion 9 defined by a bottom wall 10 and opposed lower side walls 11 and 12 extending upwardly and outwardly from the bottom wall 10 and spaced lower front and rear end walls 13 and 14 respectively. A suitable reinforcing member 15 is secured to an upper edge of the lower side walls 11 and 12 and the lower front and rear end walls 13 and 14 to thereby provide a substantially rigid structure.

The illustrated mixing chamber 4 also includes an upper portion 16 which is defined by spaced upper side walls 17 and 18 each having a lower edge portion thereof suitably secured to the reinforcing member 15, as by welding, and extending upwardly from the lower side walls 11 and 12 respectively and by upper front and rear end walls 19 and 20 suitably secured to the reinforcing member 15, as by welding, and extending upwardly from the lower front and rear end walls 13 and 14 respectively.

It may be desirable to increase the size and thereby the capacity of the mixing chamber 4. Therefore, a suitable flange 21 extends laterally outwardly from respective upper edges of the upper side walls 17 and 18 and the upper front and end walls 19 and 20 of the upper portion 16 to thereby provide a substantially rigid structure and provide support for a chamber extension 22.

The passage 8 may be below the chamber 4 or in other suitable receiving position. In the illustrated structure the passage 8 is positioned within the lower portion 9 of the mixing chamber 4 and between the augers 2 and 3 and is defined by a pair of upwardly converging walls 23 and 24 extending upwardly from bottom portions 25 and 26 respectively which are supported on the bottom wall 10 and are illustrated as partially cylindrical elongated concave members preferably including an angle of approximately 120° thereby defining an arcuate trough or passage for movement of materials to be mixed along the lower portion of the mixing chamber 4. The augers 2 and 3 are aligned with and above the bottom portions 25 and 26 respectively.

The upwardly converging walls 23 and 24 have edges 27 and 28 respectively defining the entrance opening 7 to the compartment 8 to thereby permit mixed and blended materials to flow into the passage 8 from the mixing chamber 4.

It is desirable to maintain a door or closure member 29 in a position closing the entrance opening 7 to the passage 8 during mixing and blending of materials within the mixing chamber 4. Any suitable mounting and operation of the closure member 29 may be used. In the illustrated structure a suitable support and guide member 30 is positioned within one end portion of the passage 8 and has an upper portion of the door or closure member 29 in engagement with and slidably movable over same to selectively open and close the entrance opening 7 in response to operation of a suitable extensible member 31 having a portion thereof suitably secured to the door or closure member 29 whereby extension of the extensible member 31 moves the door or closure member 29 to a position closing the entrance opening 7 and retraction of the extensible member 31 effects movement of the door or closure member 29 to a position opening the entrance opening 7 to the passage 8.

The augers 2 and 3 each have respective opposite ends thereof rotably mounted on the lower end walls 13 and 14, as in suitable bearings, and are positioned adjacent the lower side walls 11 and 12 respectively of the lower portion 9 of the mixing chamber 4 and adjacent the bottom portions 25 and 26 respectively of the upwardly converging walls 23 and 24. The augers 2 and 3 are each adapted to operate submerged beneath a mass of materials to be mixed and each are adapted to move materials toward the entrance opening 7. The augers 2 and 3 each have a pair of opposed flights 32 and 33 thereon arranged and adapted to move materials toward an area of mutual convergence which is between adjacent ends as said opposed flights and that is preferably adjacent the entrance opening 7 to the passage 8.

The augers 2 and 3 are each illustrated as comprising hollow shafts, for lightness in weight, and having the flights 32 and 33 adapted to move material from adjacent the lower end wall 13 and 14 and toward the entrance opening 7. The flights 32 and 33 are formed of solid sheet material and wrapped in a spiral with the sheet extending from the shaft to the periphery of the respective flight. It is also desirable to effect movement of the material within the mixing chamber 4 during blending and mixing thereof. Therefore, the adjacent ends of the flights 32 and 33 on the augers 2 and 3 terminate at longitudinally offset points whereby the respective areas of mutual convergence are positioned in longitudinally offset relation one from the other. The augers 2 and 3 are rotated in opposite directions to move the material toward the center of the chamber 4 and toward the entrance opening 7 to the compartment 8.

Figure 5:
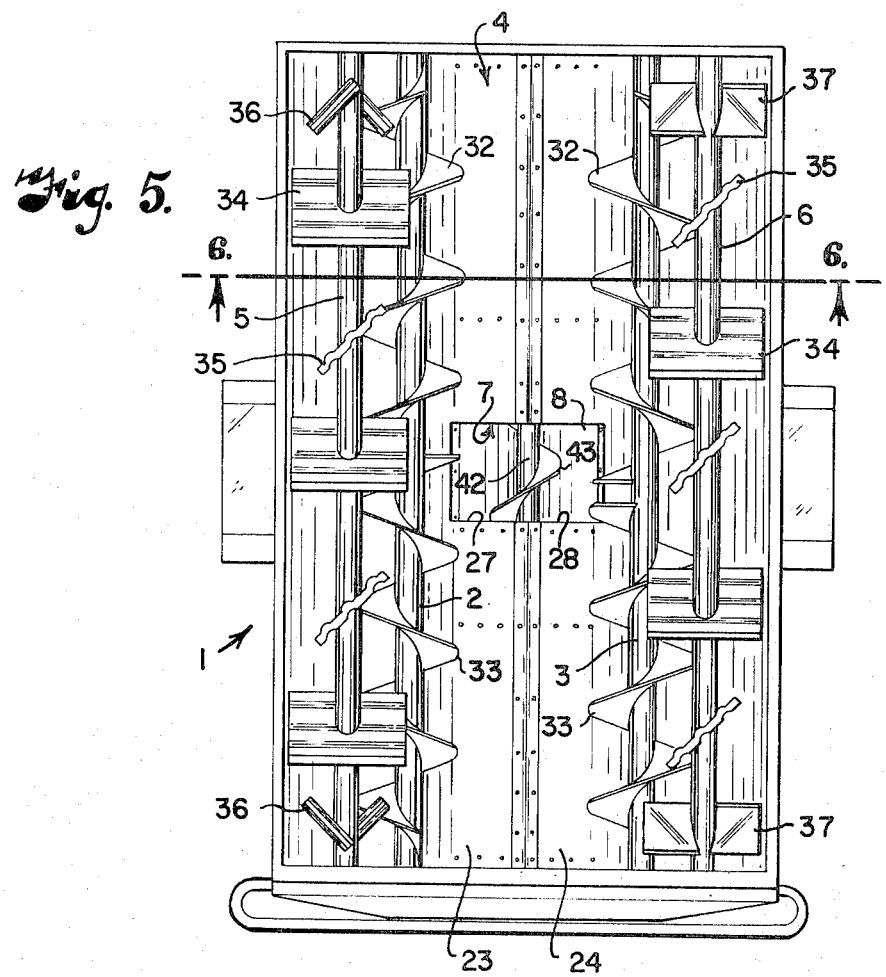
FIG. 5 is a top plan view of the material mixing apparatus and showing a materials receiving passage therein.
Figure 3:
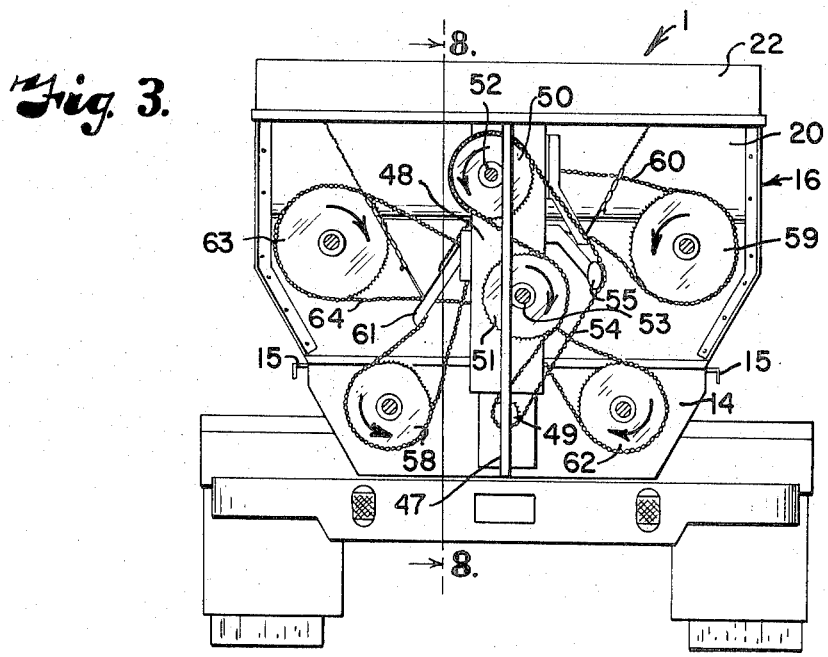
FIG. 3 is a rear elevational view of the material mixing apparatus with a cover removed to show drive means for turning the agitators and screw conveyors.

The agitators 5 and 6 in the upper portion of the mixing chamber to agitate the material and promote circulation thereof in the chamber. In the illustrated structure the agitators are positioned adjacent the upper side walls 17 and 18 respectively of the upper portion 16 and are positioned above and laterally offset from the screw conveyors 2 and 3, as best seen in FIG. 5. The agitators 5 and 6 are each adapted to operate at least partially submerged within or beneath a mass of materials to be mixed and the agitators 5 and 6 each have a plurality of spaced material engaging paddles or blades thereon, as later described. The agitators 5 and 6 are each illustrated as elongated shafts, preferably tubular or hollow for lightness in weight, and having respective opposite ends thereof rotatably mounted on the end walls 19 and 20, as in suitable bearings.

The material engaging paddles on each of the agitators 5 and 6 are arranged in a first plurality of spaced paddles 34 mounted on the respective elongated shaft and positioned thereon to form an acute angle with a longitudinal axis of the shaft and in a second plurality of paddles 35 mounted on the respective elongated shaft and positioned thereon to form a second acute angle with the longitudinal axis of the elongated shaft. The paddles of the second plurality of paddles 35 are each positioned adjacent and spaced from a respective one of the paddles 34 of the first plurality of paddles 34 whereby the first and second plurality of paddles 34 and 35 alternate along the elongated shaft.

The first and second plurality of paddles 34 and 35 preferably are each generally rectangular members with each having a longitudinal axis extending substantially normal to the longitudinal axis of the respective elongated shaft supporting same and adjacent paddles of the first and second plurality of paddles 34 and 35 each have the respective longitudinal axis thereof positioned to define an angle of substantially 90° with the longitudinal axis of the respective adjacent paddle, as best seen in FIGS. 1, 2, 5, 6 and 7.

The paddles of the first and second plurality of paddles 34 and 35 may have ghe transverse dimension thereof arranged at any desired angle relative to the respective shaft supporting same. However, it has been found that when the transverse dimension or axis of each of the paddles 34 and 35 is positioned to define an acute angle in the nature of 45° that the best mixing action is obtained to effect a substantially homogenous mix.

The paddles 34 and 35 may be formed of generally planar material, such as plates, however, the paddles 34 and 35 are illustrated as being corrugated for lightness in weight and strength.

It is desirable to eliminate the tendency for fluent materials to pack against chamber walls and to effect movement of the materials from the upper end walls 19 and 20, therefore, end paddles 36 and 37 are mounted on the agitators 5 and 6 respectively and on opposite end portions thereof and positioned adjacent the respective upper front and rear end walls 19 and 20 and the end paddles 36 and 37 on each of the opposite end portions of the agitators 5 and 6 are positioned in substantially normal or perpendicular relation one with the other and each end paddle 36 and 37 is substantially one-half width or transverse dimension of the paddles 34 and 35.

The agitators 5 and 6 are rotated in opposite directions to move materials toward the center of the mixing chamber 4 and above the augers 2 and 3 and above the compartment 8. The agitators 5 and 6 are rotated at speeds slower than each of the augers 2 and 3 to cooperate therewith and effect a movement of the materials in the mixing chamber 4.

After the materials within the mixing chamber 4 have been thoroughly blended and mixed, the door or closure member 29 is moved to open the entrance opening 7 thereby permitting the materials to be moved into the compartment 8. The compartment 8 is illustrated as having a passage therein defined by an upper wall 38 which is generally arcuate and positioned within an upper portion of the compartment 8 and by upwardly and outwardly diverging walls 39 and 40 extending upwardly and outwardly from a partially cylindrical elongated concave bottom portion adjacent the bottom wall 10 of the lower portion 9 of the mixing chamber 4.

A suitable material conveying member is positioned in the passage for moving the materials from the mixing chamber 4 and through the passage 8 and into a suitable elevator 41 adjacent one of the opposite ends of the mixing chamber, for example, the lower front end wall 13 and communicating with the passage 8. The material conveying member is illustrated as a screw conveyor 42 having a flight 43 mounted on a tubular shaft and having a drive shaft 45 extending therethrough. One end of the tubular shaft 43 is rotatably supported on the support and guide member 30 and the other end thereof is suitably rotatably supported in the elevator 41, as in suitable bearings respectively.

Suitable drive means are provided and are operatively connected to each of the augers 2 and 3 and to the screw conveyor 42 and to each of the agitators 5 and 6 to effect rotation thereof for blending of the mass material and moving of same from the mixing chamber 4 into and through the passage 8. In the illustrated structure, a power shaft 46 is operatively connected to a suitable source of rotative power, such as a motor or a power take off of a prime mover, tractor or the like, and is operative to rotate the drive shaft 45 which in the illustrated structure extends through the lower rear end wall 14 of the lower portion 9 of the mixing chamber 4 and is rotatably supported thereon, as in suitable bearings. A support member 47 is spaced from the lower rear end wall 14 and the upper rear end wall 20 and has the drive shaft 45 suitably rotatably supported thereon, as in a suitable bearing. An intermediate support member 48 is positioned between the support member 47 and the lower rear end wall 14 and the upper rear end wall 20, for a purpose as later described.

The drive shaft 45 may be operatively connected to the screw conveyors 2 and 3 and to the agitators 5 and 6 in any suitable manner to effect rotation thereof in the desired directions. In the illustrated structure, a sprocket 49 is mounted on the drive shaft 45 and is positioned between the support member 47 and the intermediate support member 48. Upper and lower sprockets 50 and 51 respectively are suitably mounted on upper and lower shafts 52 and 53 respectively extending rearwardly from the upper rear end wall 20 of the upper portion 16 of the mixing chamber 4 and rotatably supported on the upper rear end wall 20 and the support member 47. A suitable chain 54 engages the sprocket 49 on the drive shaft 45 and the upper and lower sprockets 50 and 51 and a suitable chain tightener 55 whereby rotation of the drive shaft 45 effect rotation of the upper and lower sprockets 50 and 51 and thereby rotation of the upper and lower shafts 52 and 53 and second upper and lower sprockets 56 and 57 respective mounted on the upper and lower shaft 52 and 53 and positioned between the intermediate support member 48 and the upper rear end wall 20.

In the illustrated drive means, rotation of the upper shaft 52 is effective to rotate one of the screw conveyors and one of the agitators, for example, the screw conveyor 2 adjacent the lower side wall 11 and the agitator 6 adjacent the upper side wall 18 with the rotation being in the same direction and toward the center of the mixing chamber 4. A sprocket 58 is mounted on the screw conveyor 2 and a sprocket 59 is mounted on the agitator 6 with a chain 60 extending between and operatively engaging the sprockets 58 and 59, the second upper sprocket 56 and a chain tightener 61 whereby rotation of the drive shaft 45 effects rotation of the upper shaft 52 and the second upper sprocket 56 thereon and thereby rotation of the auger 2 and the agitator 6.

Rotation of the lower shaft 53 is effective to rotate the other auger 3 and the other agitator 5. A sprocket 62 is mounted on the auger 3 and a sprocket 63 is mounted on the agitator 5 with a chain 64 extending between and operatively engaging the sprockets 62 and 63, the second lower sprocket 57 and a chain tightener 65 whereby rotation of the drive shaft 45 also effects rotation of the lower shaft 53 and the second lower sprocket 57 thereon and thereby rotation of the screw conveyor 3 and the agitator 5.

The sprockets 58 and 62 for the screw conveyors 2 and 3 respectively are illustrated as being of a smaller diameter than the sprockets 59 and 63 for the agitators 6 and 5 respectively whereby the screw conveyors 2 and 3 rotate faster than the agitators 5 and 6.

Figure 9:
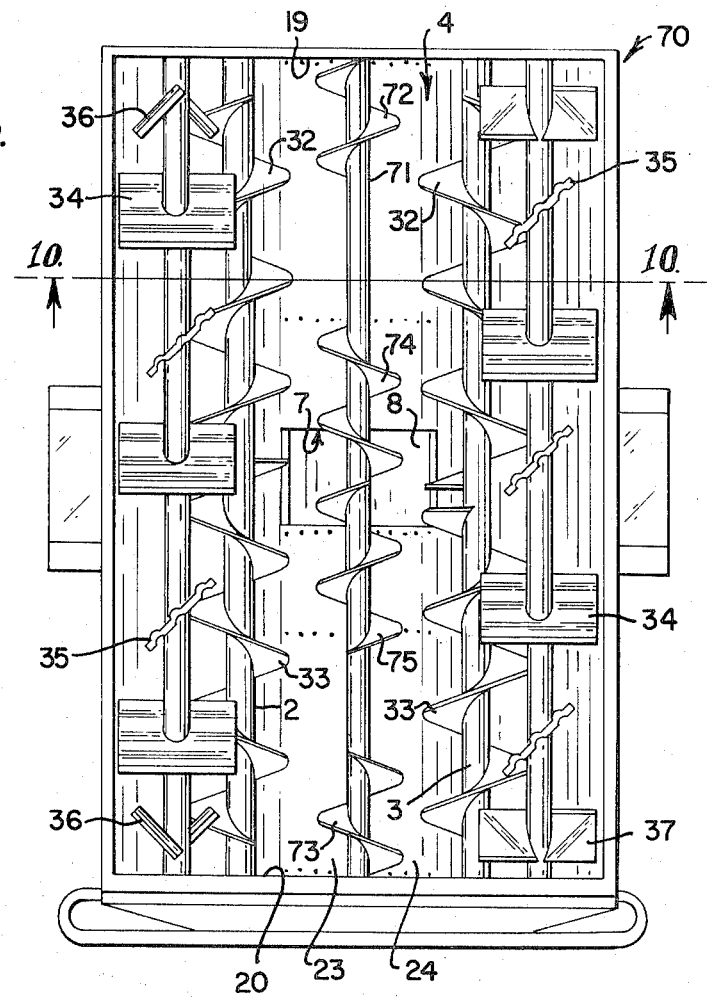
FIG. 9 is a top plan view of a modified material mixing apparatus.
Figure 10:
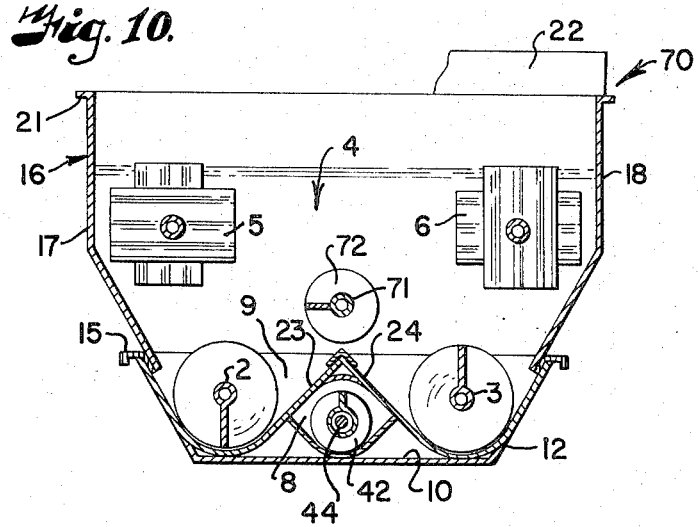
FIG. 10 is a transverse sectional view taken on line 10—10, FIG. 9.

FIGS. 9 and 10 illustrate a modified material mixing apparatus 70 which is substantially similar to the material mixing apparatus 1 except that the modified material mixing apparatus 70 includes an auxiliary auger 71 extending between the upper front and rear end walls 19 and 20 and positioned above the passage 8 and between the augers 2 and 3.

The auxiliary auger 71 is adapted to move materials from the upper front and rear end walls 19 and 20 and to prevent bridging of the materials above the entrance opening 7 to the passage 8. In the illustrated structure, the auxiliary auger 71 has opposite end flights 72 and 73 adapted to move materials from adjacent the upper front and rear end walls 19 and 20 respectively. The auxiliary auger 71 also has a pair of center flights 74 and 75 thereon and positioned above the entrance opening 7 to the passage 8 and each adapted to move materials adjacent the entrance opening 7 to prevent bridging thereover.

The auxiliary auger 71 may be drivein in any suitable manner, however, the shaft 53 has been extended from the intermediate support member 48 and through the upper rear end wall 20 and suitably rotatably mounted thereon and on the upper front end wall 19, as in suitable bearings.

Operation of the modified material mixing apparatus 70 is substantially similar to operation of the material mixing apparatus 1 except that the auxiliary auger 71 effects a more thorough blending and mixing of the materials within the mixing chamber and eliminates dead spots adjacent the upper front and rear end walls 19 and 20 respectively and the auxiliary auger 71 eliminates bridging of the materials above the entrance opening 7 to the passage 8.

Figure 11:
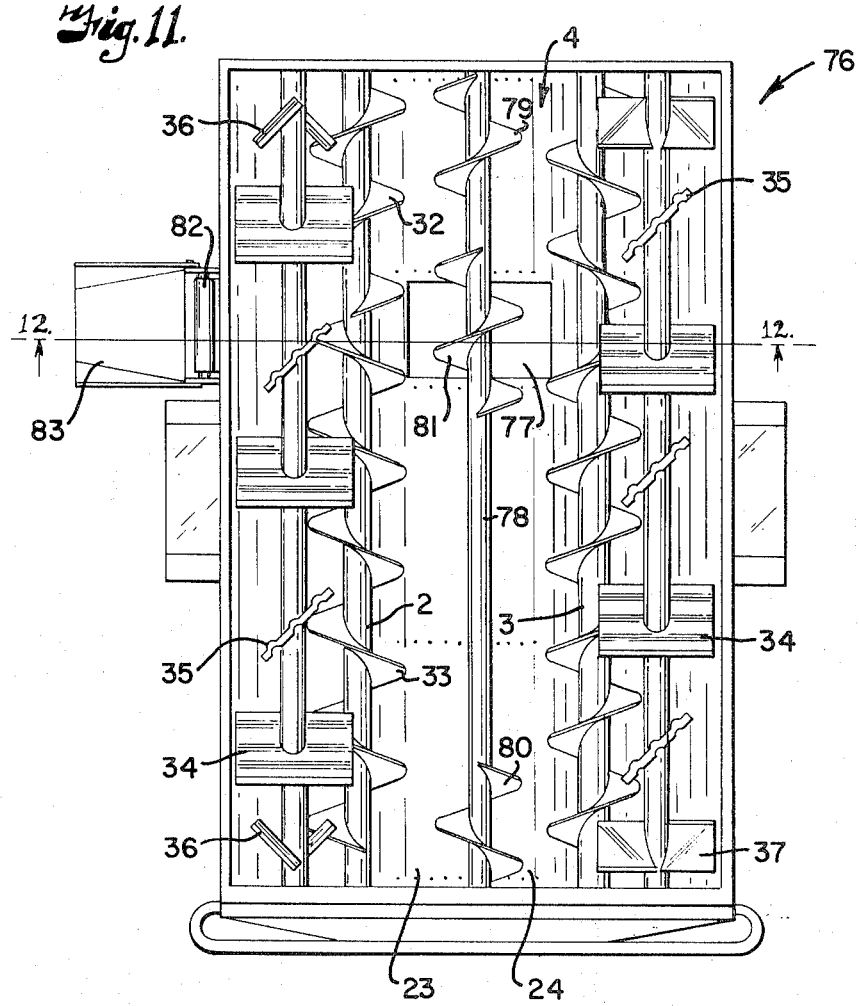
FIG. 11 is a top plan view of an other modified material mixing apparatus.
Figure 12:
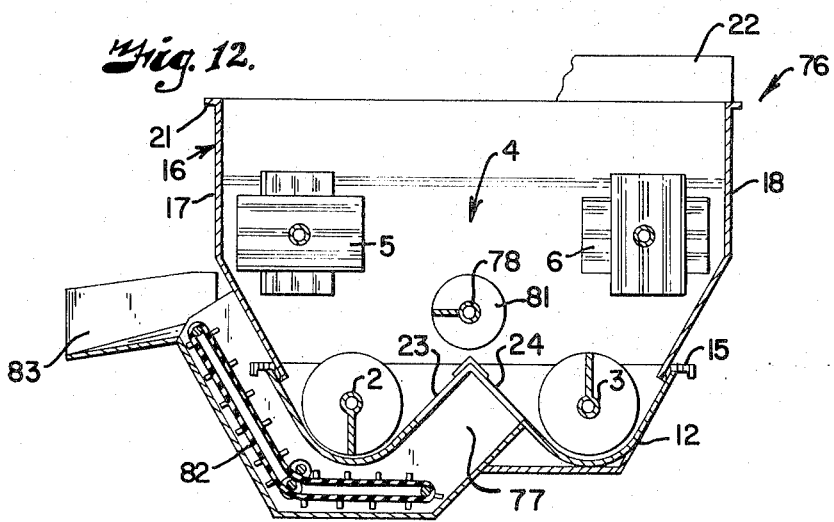
FIG. 12 is a transverse sectional view taken on line 12—12, FIG. 11.

FIGS. 11 and 12 illustrate an other modified material mixing apparatus 76 substantially similar in operation to the modified material mixing apparatus 70 except that the passage 8 is replaced by a receptacle which has an entrance opening 77 positioned adjacent but spaced from one of the end walls of the mixing chamber, for example, the front end walls 13 and 19. An auxiliary auger 78 extends between the upper front and rear end walls 19 and 20 and is positioned above the receptacle and between the augers 2 and 3. The auxiliary auger 78 is also adapted to move material away from the upper front and rear end walls 19 and 20 and to eliminate bridging over the entrance opening 77 to the receptacle.

In the illustrated structure, the auxiliary auger 78 has opposite end flights 79 and 80 mounted thereon and each adapted to move materials away from the upper front and rear end walls 19 and 20 respectively. The auxiliary auger 78 has a center flight 81 thereon and adapted to move materials adjacent the engrance opening 77 to the receptacle to prevent bridging.

The modified material mixing apparatus 76 illustrated in FIGS. 11 and 12, has a suitable conveyor 82 and a discharge chute 83 extending from one side of the mixing chamber and preferably positioned forwardly of truck or trailer wheels. In illustrated structure the conveyor 82 is of a type and adapted to receive through the entrance opening 77 and to move the materials from the receptacle and through the discharge chute 83.

It is to be understood that while I have illustrated and described one form of my invention, it is not to be limited to the specific form or arrangement of parts herein described and shown.

What I claim and desire to secure by Letters Patent is:

1. A material mixing apparatus comprising:
   a. a mixing chamber adapted to contain materials to be mixed, said mixing chamber being defined by a bottom wall and opposite side walls extending upwardly from the bottom wall and spaced end walls connected to said bottom wall and said side walls;
   b. material moving means within said mixing chamber and positioned adjacent each of said side walls for moving the materials along the bottom wall;
   c. material mixing means within said mixing chamber and positioned adjacent said side walls and above said material moving means for stirring and mixing materials above said material moving means;
   d. a passage within said mixing chamber and positioned adjacent the bottom wall and substantially centered between said side walls and having an entrance opening to permit materials to flow into said passage from said mixing chamber;
   e. means adjacent the entrance opening to said passage for selectively opening and closing said entrance opening; and
   f. means within said passage for receiving materials and discharging same from said mixing chamber.

2. A material mixing apparatus as set forth in claim 1 wherein:
   a. said entrance opening to said passage is positioned intermediate said end walls of said mixing chamber;
   b. said material moving means comprises a pair of augers with a respective auger adjacent each of said side walls with each having a pair of flights thereon arranged and adapted to move materials toward an area of mutual convergence adjacent said entrance opening to said passage;
   c. said material mixing means comprises a pair of agitators with a respective agitator adjacent each of said side walls with each having an elongated shaft having a first plurality of paddles mounted on said shaft and positioned to form an acute angle with a longitudinal axis of said respective elongated shaft and a second plurality of paddles mounted on said shaft and positioned to form a second acute angle with the longitudinal axis of said shaft; and
   d. each of said paddles of said second plurality of paddles is positioned adjacent and spaced from at least one of said paddles of said first plurality of paddles.

3. A material mixing apparatus as set forth in claim 1 wherein:
   a. the area of mutual convergence for said pair of augers is positioned in longitudinally offset relation one from the other;
   b. said augers are rotated in opposite directions to move lower portions of the flights thereon toward the entrance opening to said passage to thereby move the materials toward the entrance opening to said passage;
   c. said agitators are rotated in opposite directions to move the materials toward a center portion of said mixing chamber and above said compartment;
   d. said augers are each rotated at speeds faster than speeds of each of said agitators to effect a movement of the materials within said mixing chamber;
   e. said paddles of said first and said second plurality of paddles are generally rectangular members each having a longitudinal axis extending substantially normal to a longitudinal axis of said respective elongated shaft;
   f. adjacent paddles of said first and said second plurality of paddles have the respective longitudinal axis thereof positioned to define an angle of substantially ninety degrees with the longitudinal axis of the respective adjacent paddle; and g. said agitators each have end paddles mounted on opposite end portions thereof and positioned adjacent the respective end walls of said mixing chamber.

4. A material mixing apparatus as set forth in claim 1 wherein:

a. said entrance opening to said passage is positioned intermediate said end walls defining said mixing chamber;

b. said material moving means comprises a pair of augers each positioned adjacent a respective one of said side walls defining said mixing chamber and each having a pair of flights thereon arranged and adapted to move materials toward an area of mutual convergence adjacent said entrance opening to said passage and an auxiliary auger positioned above and between said first named augers;

c. said auxiliary auger has opposite end flights thereon each adapted to move materials away from a respective one of said end walls defining said mixing chamber and a pair of center flights thereon each adapted to move materials adjacent the entrance opening to said passage to eliminate bridging;

d. said material mixing means comprises a pair of agitators each positioned adjacent a respective one of said side walls defining said mixing chamber and each having an elongated shaft and a first plurality of paddles mounted on said shaft and positioned to form an acute angle with a longitudinal axis of said respective elongated shaft and a second plurality of paddles mounted on said shaft and positioned to form a second acute angle with the longitudinal axis of said shaft; and e. each of said paddles of said second plurality of paddles is positioned adjacent and spaced from at least one of said paddles of said first plurality of paddles.

5. A material mixing apparatus comprising:

a. a mixing chamber adapted to contain materials to be mixed, said mixing chamber being defined by a bottom wall and opposed side walls extending upwardly from the bottom wall and spaced end walls connected to said bottom wall and side walls;

b. an auger adjacent each of said side walls within said mixing chamber and adapted to operate submerged beneath a mass of materials to be mixed and positioned adjacent the bottom wall and adapted to move materials within a lower portion of said mixing chamber;

c. each of said augers having a pair of flights thereon arranged and adapted to move materials toward an area of mutual convergence and toward the longitudinal center of said mixing chamber;

d. a plurality of rotatable agitators each adapted to operate at least partially submerged beneath a mass of materials to be mixed, said agitators being above said auger and each having a plurality of spaced material engaging paddles thereon, said agitators being adapted to move the materials toward a longitudinal center of said mixing chamber, each of said agitators including:

1. an elongated shaft having opposite ends thereof rotatably mounted on said end walls;

2. a first plurality of spaced paddles mounted on said elongated shaft and positioned thereon to form an acute angle with a longitudinal axis of said elongated shaft;

3. a second plurality of spaced paddles mounted on said elongated shaft and positioned thereon to form a second acute angle with the longitudinal axis of said elongated shaft, each of said paddles of said second plurality of paddles being positioned adjacent and spaced from a respective one of said paddles of said first plurality of paddles;

e. drive means operatively connected to said auger and to each of said agitators to effect rotation thereof and thereby blending of said mass of materials within said mixing chamber.

6. A material mixing apparatus as set forth in claim 5 wherein:

a. said paddles of said first and said second plurality of paddles are generally rectangular members each having a longitudinal axis extending substantially normal to a longitudinal axis of said respective elongated shaft;

b. adjacent paddles of said first and said second plurality of paddles have the respective longitudinal axis thereof positioned to define an angle of substantially ninety degrees with the longitudinal axis of the respective adjacent paddle; and c. said agitators each have end paddles mounted on opposite end portions thereof and positioned adjacent the respective end walls of said mixing chamber.

7. A material mixing apparatus comprising:

a. a mixing chamber adapted to contain materials to be mixed, said mixing chamber being defined by a bottom wall and opposed side walls extending upwardly from the bottom wall and spaced end walls connected to said bottom wall and side walls;

b. an auger adjacent each of said side walls within said mixing chamber and adapted to operate submerged beneath a mass of materials to be mixed and positioned adjacent the bottom wall and adapted to move materials within a lower portion of said mixing chamber;

c. each of said augers having a pair of flights thereon arranged and adapted to move materials toward an area of mutual convergence and toward the longitudinal center of said mixing chamber;

d. a plurality of rotatable agitators each adapted to operate at least partially submerged beneath a mass of materials to be mixed, said agitators being above said auger and each having a plurality of spaced material engaging paddles thereon, said agitators being adapted to move the materials toward a longitudinal center of said mixing chamber;

e. drive means operatively connected to said auger and to each of said agitators to effect rotation thereof and thereby blending of said mass of materials within said mixing chamber;

f. a passage at the lower portion of said mixing chamber and defined by a pair of converging walls extending from the bottom wall of said mixing chamber, said passage being between said augers;

g. said bottom wall and converging walls having an entrance opening to said passage to thereby permit materials to flow thereto from said mixing chamber;

h. closure means operable to selectively open and close the entrance opening to said passage; and i. means within said passage for receiving and moving materials to discharge same from said passage.

8. A material mixing apparatus as set forth in claim 7 includes an auxiliary auger extending between said end walls defining said mixing chamber and positioned above said passage and between said first named augers, said auxiliary auger having opposite end flights thereon each adapted to move materials away from a respective one of said end walls defining said mixing chamber, said auxiliary auger having a center flight thereon adapted to move materials adjacent the entrance opening and eliminate bridging thereover.

9. A material mixing apparatus as set forth in claim 7 wherein:

a. said augers are rotated in opposite directions to move lower portions of the flights thereon toward the entrance opening to said passage to thereby move materials toward the entrance opening to said passage;

b. said agitators are rotated in opposite directions to move the materials toward a longitudinal center portion of said mixing chamber; and c. said augers are each rotated at speeds faster than speeds of each of said agitators to effect a movement of the materials within said mixing chamber.

10. A material mixing apparatus comprising:

a. a mixing chamber adapted to contain materials to be mixed, said mixing chamber being defined by a bottom wall and opposed side walls extending upwardly from the bottom wall and spaced end walls connected to said bottom wall and side walls;

b. at least one rotatable auger within said mixing chamber and adapted to operate submerged beneath a mass of materials to be mixed and positioned adjacent the bottom wall and adapted to move materials within a lower portion of said mixing chamber;

c. a plurality of rotatable agitators each adapted to operate at least partially submerged beneath a mass of materials to be mixed, said agitators being above said auger and each having a plurality of spaced material engaging paddles thereon, said agitators being adapted to move the materials toward a longitudinal center of said mixing chamber;

d. drive means operatively connected to said auger and to each of said agitators to effect rotation thereof and thereby blending of said mass of materials within said mixing chamber;

e. a passage within said mixing chamber and positioned adjacent the bottom wall thereof and defined by a pair of upwardly converging walls extending upwardly from the bottom wall of said mixing chamber and positioned between said augers;

f. said converging walls having an entrance opening to said passage defined by spaced edge and for flow from said mixer chamber into said passage;

g. means adjacent said opening defining edges for selectively opening and closing the entrance opening to said passage;

h. means within said passage for receiving and moving materials to discharge same from said mixing chamber; and i. means mounted on said mixing chamber and communicating with said passage for receiving materials therefrom and directing same from the mixing chamber.

11. A material mixing apparatus comprising:

a. a mixing chamber adapted to contain materials to be mixed, said mixing chamber being defined by a bottom wall and opposed side walls extending upwardly from the bottom wall and spaced end walls connected to said bottom wall and side walls;

b. at least one rotatable auger within said mixing chamber and adapted to operate submerged beneath a mass of materials to be mixed and positioned adjacent the bottom wall and adapted to move materials within a lower portion of said mixing chamber;

c. a plurality of rotatable agitators each adapted to operate at least partially submerged beneath a mass of materials to be mixed, said agitators being above said auger and each having a plurality of spaced material engaging paddles thereon, said agitators being adapted to move the materials toward a longitudinal center of said mixing chamber;

d. drive means operatively connected to said auger and to each of said agitators to effect rotation thereof and thereby blending of said mass of materials within said mixing chamber;

e. said mixing chamber has an auger adjacent each of said side walls thereof;

f. said mixing chamber has a passage in a lower portion thereof and positioned between said augers;

g. said passage has an entrance opening to permit materials to flow thereinto from said mixing chamber;

h. said passage has means therein for receiving and moving materials to discharge same from said passage;

i. each of said augers has a pair of flights thereon arranged and adapted to move materials toward an area of mutual convergence adjacent the entrance opening to said passage;

j. the entrance opening to said passage is spaced from the end walls of said mixing chamber.

12. A material mixing apparatus comprising:

a. a mixing chamber adapted to contain materials to be mixed, said mixing chamber being defined by a bottom wall and opposed side walls extending upwardly from the bottom wall and spaced end walls connected to said bottom wall and side walls;

b. at least one rotatable auger within said mixing chamber and adapted to operate submerged beneath a mass of materials to be mixed and positioned adjacent the bottom wall and adapted to move materials within a lower portion of said mixing chamber;

c. a plurality of rotatable agitators each adapted to operate at least partially submerged beneath a mass of materials to be mixed, said agitators being above said auger and each having a plurality of spaced material engaging paddles thereon, said agitators being adapted to move the materials toward a longitudinal center of said mixing chamber, each of said agitators including:

1. an elongated shaft having oppoisite ends thereof rotatably mounted on said end walls;

2. a first plurality of spaced paddles mounted on said elongated shaft and positioned thereon to form an acute angle with a longitudinal axis of said elongated shaft;

3. a second plurality of spaced paddles mounted on said elongated shaft and positioned thereon to form a second acute angle with the longitudinal axis of said elongated shaft, each of said paddles of said second plurality of paddles being positioned adjacent and spaced from a respective one of said paddles of said first plurality of paddles;

d. drive means operatively connected to said auger and to each of said agitators to effect rotation thereof and thereby blending of said mass of materials within said mixing chamber.

* * * * *